(12) United States Patent
Jurdi et al.

(10) Patent No.: US 12,736,609 B2
(45) Date of Patent: Sep. 15, 2026

(54) COUNTERACTING HUMAN BLOCKAGE IN WIRELESS INDOOR POSITIONING

(71) Applicant: Samsung Electronics Co., Ltd., Suwon-si (KR)

(72) Inventors: Rebal Al Jurdi, Allen, TX (US); Yuming Zhu, Plano, TX (US); Kyu-Hui Johnny Han, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 18/791,086

(22) Filed: Jul. 31, 2024

(65) Prior Publication Data

US 2025/0060449 A1 Feb. 20, 2025

Related U.S. Application Data

(60) Provisional application No. 63/533,307, filed on Aug. 17, 2023.

(51) Int. Cl.
*G01S 5/14* (2006.01)
*G01S 5/02* (2010.01)

(52) U.S. Cl.
CPC .............. *G01S 5/145* (2013.01); *G01S 5/021* (2013.01)

(58) Field of Classification Search
CPC ....... G01S 5/145; G01S 5/021; G01S 5/02585
See application file for complete search history.

(56) References Cited

U.S. PATENT DOCUMENTS

| | | | | |
|---|---|---|---|---|
| 10,866,302 B2 | 12/2020 | Wu et al. | | |
| 11,500,056 B2 | 11/2022 | Wu et al. | | |
| 2013/0196681 A1* | 8/2013 | Poduri | .................. | H04W 64/00 455/456.1 |
| 2014/0080515 A1 | 3/2014 | Pakzad | | |
| 2019/0230478 A1* | 7/2019 | Peppler | ................. | G01S 13/825 |
| 2021/0064043 A1 | 3/2021 | Kulkarni et al. | | |

FOREIGN PATENT DOCUMENTS

| | | |
|---|---|---|
| CN | 114791286 A | 7/2022 |
| CN | 114845250 A | 8/2022 |
| CN | 117723057 A | 3/2024 |

(Continued)

OTHER PUBLICATIONS

Jin, Zhiang et al. (2023), "Real-Time Indoor Positioning Based on BLE Beacons and Pedestrian Dead Reckoning for Smartphones", Applied Sciences, 13, 4415, doi: 10.3390/app13074415.

(Continued)

*Primary Examiner* — Resha Desai
*Assistant Examiner* — Bongani Jabulani Mashele

(57) ABSTRACT

A method for estimating a position of a moving object comprises receiving one or more ranging measurements for distances between an object and one or more anchor points from a ranging device, receiving sensing data from one or more sensors, determining a distance and a heading direction of the object relative to a position of the one or more anchor points based on the one or more ranging measurements and the sensing data, applying a mapping using the distance and the heading direction of the object to correct the ranging measurements, and determining a position of the object based on the corrected ranging measurements.

20 Claims, 15 Drawing Sheets

(56) References Cited

FOREIGN PATENT DOCUMENTS

| | | | |
|---|---|---|---|
| CN | 115103299 | B | 4/2024 |
| KR | 10-2015-0035745 | A | 4/2015 |
| KR | 10-2018-0059094 | A | 6/2018 |

OTHER PUBLICATIONS

Li, Beibei et al. (2019), "An indoor location algorithm based on Kalman filter fusion of ultra-wide band and inertial measurement unit", AIP Advances 9, 085210, doi: 10.1063/1.5117341.

Zheng, Meng-Cong et al. (2019), "Designing indoor navigation interfaces on smartphones compatible with human information processing in an emergency evacuation scenario", Journal of Asian Architecture and Building Engineering, vol. 18, No. 6, 599-616, doi: 10.1080/13467581.2019.1696805.

International Search Report and Written Opinion for PCT/KR2024/011964 by Korean Intellectual Property Office dated Oct. 31, 2024.

* cited by examiner

COUNTERACTING HUMAN BLOCKAGE IN WIRELESS INDOOR POSITIONING

CROSS-REFERENCE TO RELATED APPLICATIONS

This application claims the benefit of priority from U.S. Provisional Application No. 63/533,307, entitled "METHOD FOR COUNTERACTING HUMAN BLOCKAGE IN WIRELESS INDOOR POSITIONING," filed Aug. 17, 2023, which is incorporated herein by reference in its entirety.

TECHNICAL FIELD

This disclosure relates generally to wireless communication systems, and more particularly to, for example, but not limited to, positioning in wireless communication systems.

BACKGROUND

Over the past decade, indoor positioning has surged in popularity, driven by the increasing number of personal wireless devices and the expansion of wireless infrastructure. Various indoor positioning applications have emerged, spanning smart homes, buildings, surveillance, disaster management, industry, and healthcare, all demanding broad availability and precise accuracy. However, traditional positioning methods often suffer from limitations such as inaccuracy, impracticality, and scarcity. Ultra-wideband (UWB) technology has been adopted for indoor positioning. While UWB offers great accuracy, it lacks widespread adoption of UWB devices for use as ranging anchor points, unlike Wi-Fi, which is ubiquitous in commercial and residential environments. With Wi-Fi access points and stations pervading most spaces, indoor positioning using Wi-Fi has emerged as a preferred solution.

The description set forth in the background section should not be assumed to be prior art merely because it is set forth in the background section. The background section may describe aspects or embodiments of the present disclosure.

SUMMARY

An aspect of the present disclosure provides a method for estimating a position of a moving object. The method comprises receiving one or more ranging measurements for distances between an object and one or more anchor points from a ranging device. The method comprises receiving sensing data from one or more sensors. The method comprises determining a distance and a heading direction of the object relative to a position of the one or more anchor points based on the one or more ranging measurements and the sensing data. The method comprises applying a mapping using the distance and the heading direction of the object to correct the ranging measurements. The method comprises determining a position of the object based on the corrected ranging measurements.

In some embodiments, the method further comprises inferring a motion vector from a history of position estimates, the ranging measurements, and the sensing data, computing an anchor point vector defined as a vector extending from an estimated position of the object to the position of the one or more anchor points, computing an AP direction as the angle between the motion vector and the anchor point vector.

In some embodiments, the mapping is a trained mapping that is learned from labeled data through statistical analysis or supervised machine learning.

In some embodiments, the mapping is defined analytically using a function.

In some embodiments, the mapping is defined to give a mean and variance of a measurement noise as a function of a distance-type quantity and a heading direction.

In some embodiments, the mapping is a measurement noise covariance for a pair of anchor points.

In some embodiments, the method further comprises using a Kalman filter to process the ranging measurements to compensate for blockage effects.

In some embodiments, the sensing data are associated with at least one of acceleration, orientation, rotational velocity, step size or step heading.

In some embodiments, the method further comprises determining the distance and the heading direction of the object relative to the position of the one or more anchor points based on a sequence of prior position estimates.

In some embodiments, the mapping is a learned mapping that is determined by sampling a premises to determine ground truth positions of the one or more anchor points and ranging errors for different distances and angles relative to the one or more anchor points.

One aspect of the present disclosure provides a device for estimating a position of the device. The device comprises one or more sensors configured to provide sensing data, and a processor coupled to the one or more sensors. The processor is configured to cause receiving one or more ranging measurements for distances between an object and one or more anchor points from a ranging device. The processor is configured to cause receiving sensing data from the one or more sensors. The processor is configured to cause determining a distance and a heading direction of the object relative to a position of the one or more anchor points based on the one or more ranging measurements and the sensing data. The processor is configured to cause applying a mapping using the distance and the heading direction of the object to correct the ranging measurements. The processor is configured to cause determining a position of the object based on the corrected ranging measurements.

In some embodiments, the processor is further configured to cause: inferring a motion vector from a history of position estimates, the ranging measurements, and the sensing data, computing an anchor point vector defined as a vector extending from an estimated position of the object to the position of the one or more anchor points, and computing an AP direction as the angle between the motion vector and the anchor point vector.

In some embodiments, the mapping is a trained mapping that is learned from labeled data through statistical analysis or supervised machine learning.

In some embodiments, the mapping is defined analytically using a function.

In some embodiments, the mapping is defined to give a mean and variance of a measurement noise as a function of a distance-type quantity and a heading direction.

In some embodiments, the mapping is a measurement noise covariance for a pair of anchor points.

In some embodiments, the processor is further configured to cause using a Kalman filter to process the ranging measurements to compensate for blockage effects.

In some embodiments, the sensing data are associated with at least one of acceleration, orientation, rotational velocity, step size or step heading.

In some embodiments, the processor is further configured to cause determining the distance and the heading direction of the object relative to the position of the one or more anchor points based on a sequence of prior position estimates.

In some embodiments, the mapping is a learned mapping that is determined by sampling a premises to determine ground truth positions of the one or more anchor points and ranging errors for different distances and angles relative to the one or more anchor points.

BRIEF DESCRIPTION OF THE DRAWINGS

FIG. 1 illustrates an example of a wireless network in accordance with an embodiment.

Figure 2A:
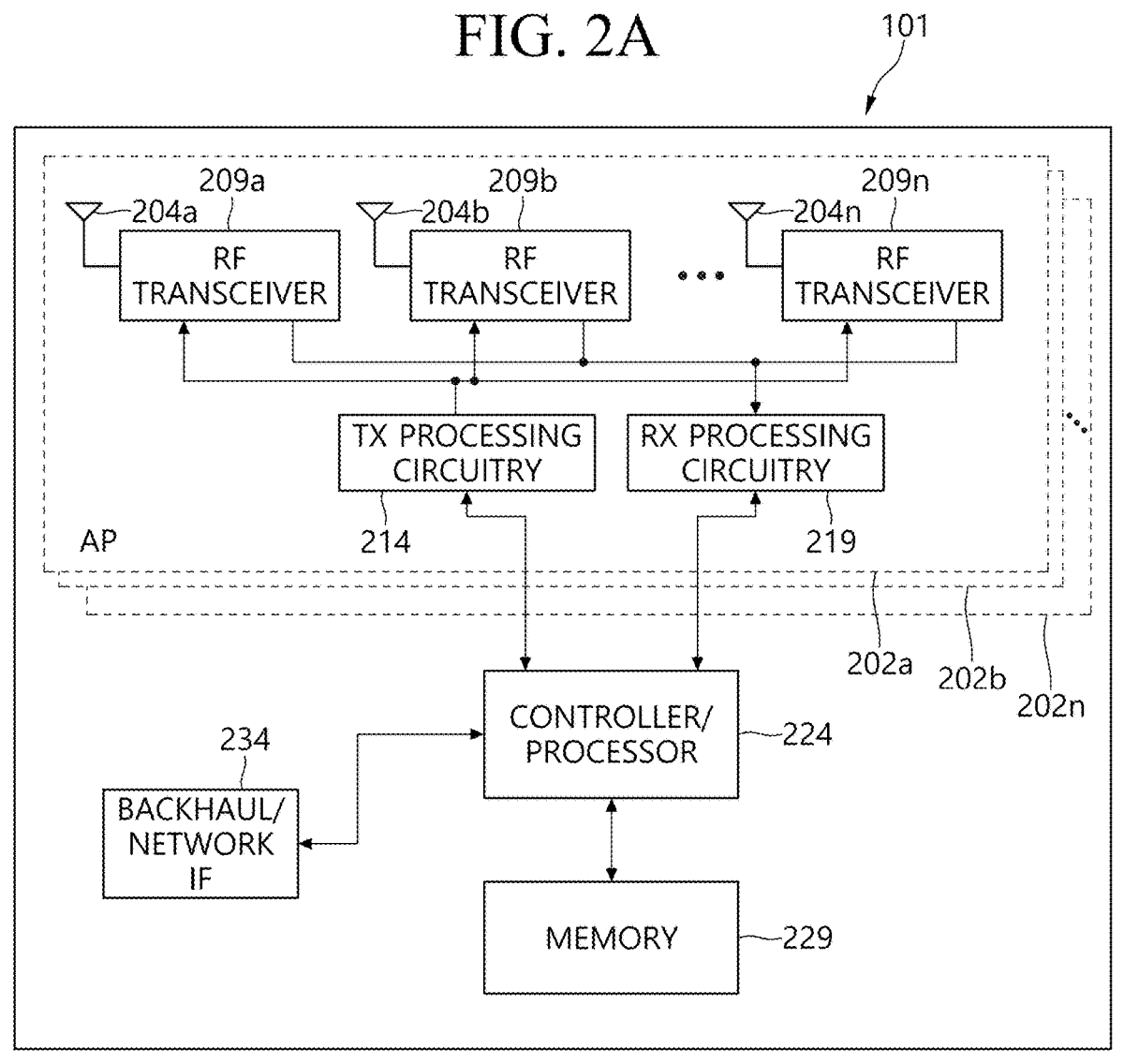

FIG. 2A illustrates an example of AP in accordance with an embodiment.

FIG. 10 illustrates an example of human blockage in accordance with an embodiment.

Figure 2B:
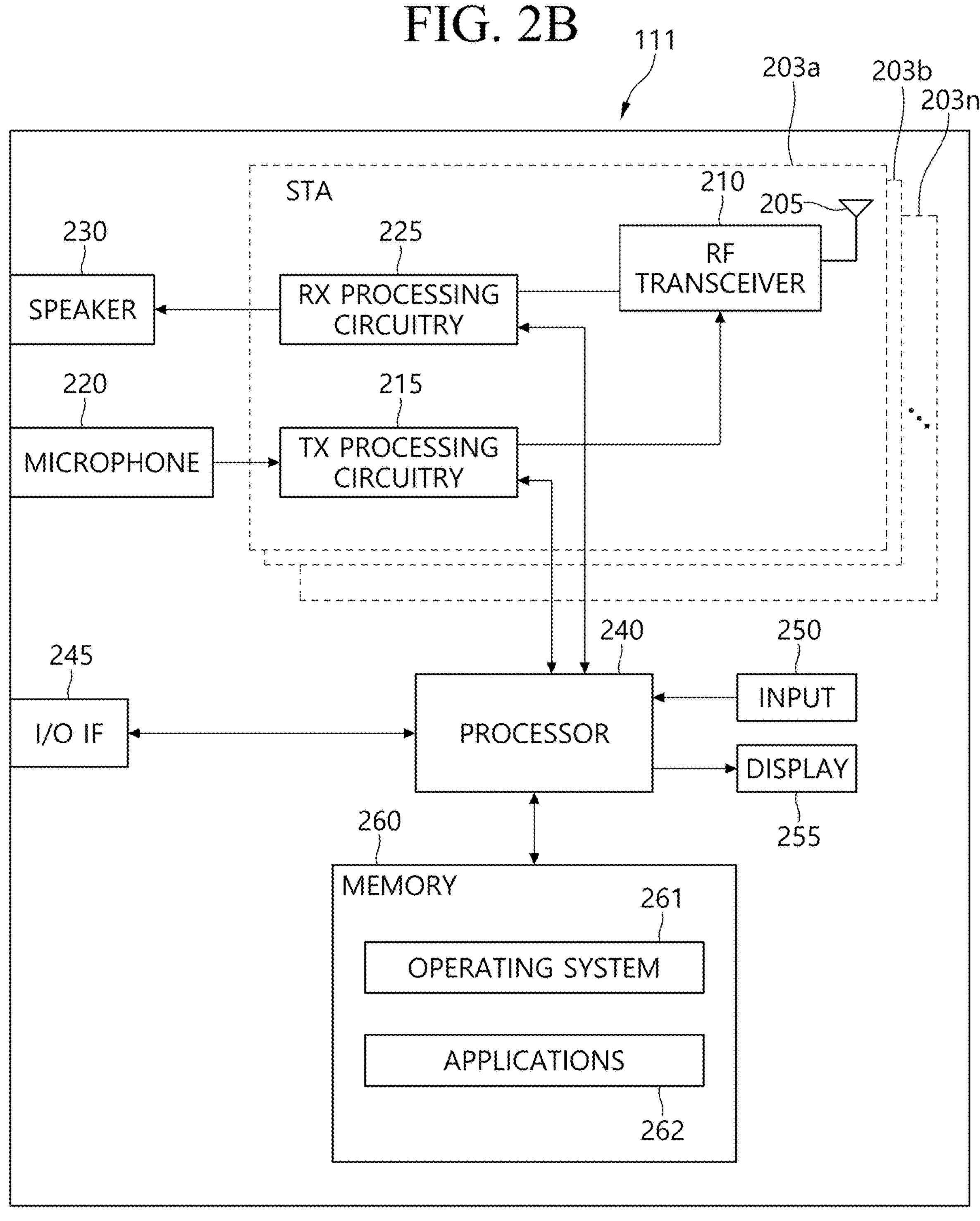
FIG. 2B illustrates an example of STA in accordance with an embodiment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

The following description is directed to certain implementations for the purpose of describing the innovative aspects of this disclosure. However, a person having ordinary skill in the art will readily recognize that the teachings herein can be applied in a multitude of different ways. The examples in this disclosure are based on WLAN communication according to the Institute of Electrical and Electronics Engineers (IEEE) 802.11 standard, including IEEE 802.11be standard and any future amendments to the IEEE 802.11 standard. However, the described embodiments may be implemented in any device, system or network that is capable of transmitting and receiving radio frequency (RF) signals according to the IEEE 802.11 standard, the Bluetooth standard, Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), 5G NR (New Radio), AMPS, or other known signals that are used to communicate within a wireless, cellular or internet of things (IoT) network, such as a system utilizing 3G, 4G, 5G, 6G, or further implementations thereof, technology.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Multi-link operation (MLO) is a key feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-AP MLD to discover, authenticate, associate, and set up multiple links with an AP MLD. Channel access and frame exchange is possible on each link between the AP MLD and non-AP MLD.

Figure 1:
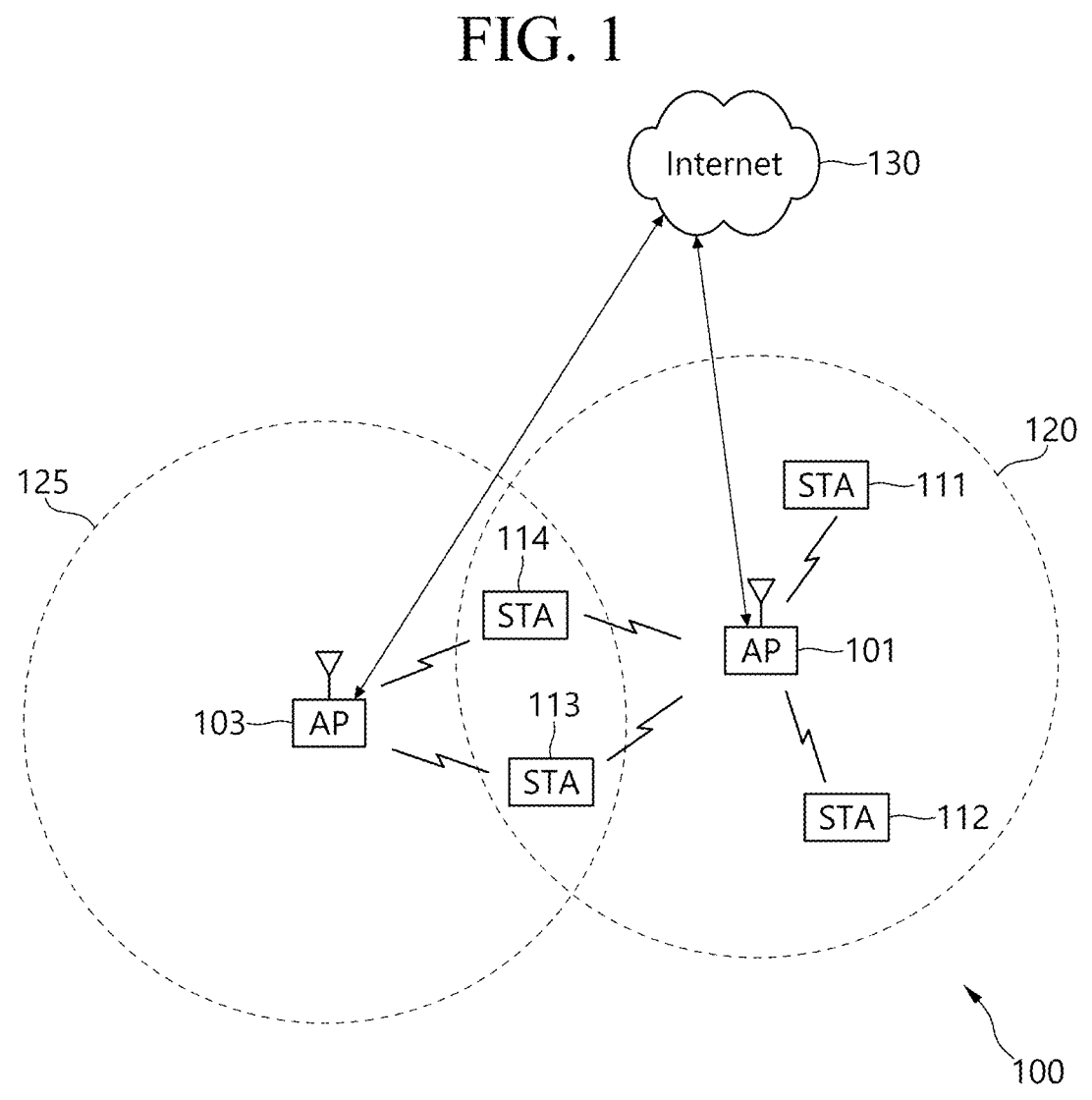

FIG. 1 shows an example of a wireless network 100 in accordance with an embodiment. The embodiment of the wireless network 100 shown in FIG. 1 is for illustrative purposes only. Other embodiments of the wireless network 100 could be used without departing from the scope of this disclosure.

As shown in FIG. 1, the wireless network 100 may include a plurality of wireless communication devices. Each wireless communication device may include one or more stations (STAs). The STA may be a logical entity that is a singly addressable instance of a medium access control (MAC) layer and a physical (PHY) layer interface to the wireless medium. The STA may be classified into an access point (AP) STA and a non-access point (non-AP) STA. The AP STA may be an entity that provides access to the distribution system service via the wireless medium for associated STAs. The non-AP STA may be a STA that is not contained within an AP-STA. For the sake of simplicity of description, an AP STA may be referred to as an AP and a non-AP STA may be referred to as a STA. In the example of FIG. 1, APs 101 and 103 are wireless communication devices, each of which may include one or more AP STAs. In such embodiments, APs 101 and 103 may be AP multi-link device (MLD). Similarly, STAs 111-114 are wireless communication devices, each of which may include one or more non-AP STAs. In such embodiments, STAs 111-114 may be non-AP MLD.

The APs 101 and 103 communicate with at least one network 130, such as the Internet, a proprietary Internet Protocol (IP) network, or other data network. The AP 101 provides wireless access to the network 130 for a plurality of stations (STAs) 111-114 with a coverage are 120 of the AP 101. The APs 101 and 103 may communicate with each other and with the STAs using Wi-Fi or other WLAN communication techniques.

Depending on the network type, other well-known terms may be used instead of “access point” or “AP,” such as “router” or “gateway.” For the sake of convenience, the term “AP” is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of “station” or “STA,” such as “mobile station,” “subscriber station,” “remote terminal,” “user equipment,” “wireless terminal,” or “user device.” For the sake of convenience, the terms “station” and “STA” are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

In FIG. 1, dotted lines show the approximate extents of the coverage area 120 and 125 of APs 101 and 103, which are shown as approximately circular for the purposes of illustration and explanation. It should be clearly understood that coverage areas associated with APs, such as the coverage areas 120 and 125, may have other shapes, including irregular shapes, depending on the configuration of the APs.

As described in more detail below, one or more of the APs may include circuitry and/or programming for management of MU-MIMO and OFDMA channel sounding in WLANs. Although FIG. 1 shows one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provides STAs with direct wireless broadband access to the network 130. Further, the APs 101 and/or 103 could provide access to other or additional external networks, such as external telephone networks or other types of data networks.

FIG. 2A shows an example of AP 101 in accordance with an embodiment. The embodiment of the AP 101 shown in FIG. 2A is for illustrative purposes, and the AP 103 of FIG. 1 could have the same or similar configuration. However, APs come in a wide range of configurations, and FIG. 2A does not limit the scope of this disclosure to any particular implementation of an AP.

As shown in FIG. 2A, the AP 101 may include multiple antennas 204*a*-204*n*, multiple radio frequency (RF) transceivers 209*a*-209*n*, transmit (TX) processing circuitry 214, and receive (RX) processing circuitry 219. The AP 101 also may include a controller/processor 224, a memory 229, and a backhaul or network interface 234. The RF transceivers 209*a*-209*n* receive, from the antennas 204*a*-204*n*, incoming RF signals, such as signals transmitted by STAs in the network 100. The RF transceivers 209*a*-209*n* down-convert the incoming RF signals to generate intermediate (IF) or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209*a*-209*n* receive the outgoing processed baseband or IF signals from the TX processing circuitry 214 and up-converts the baseband or IF signals to RF signals that are transmitted via the antennas 204*a*-204*n*.

The controller/processor 224 can include one or more processors or other processing devices that control the overall operation of the AP 101. For example, the controller/processor 224 could control the reception of uplink signals and the transmission of downlink signals by the RF transceivers 209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including a combination of DL MU-MIMO and OFDMA in the same transmit opportunity. In some embodiments, the controller/processor 224 may include at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 may include any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for management of channel sounding procedures in WLANs. Although FIG. 2A illustrates one example of AP 101, various changes may be made to FIG. 2A. For example, the AP 101 could include any number of each component shown in FIG. 2A. As a particular example, an AP could include a number of interfaces 234, and the controller/processor 224 could support routing functions to route data between different network addresses. As another example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

As shown in FIG. 2A, in some embodiment, the AP 101 may be an AP MLD that includes multiple APs 202*a*-202*n*. Each AP 202*a*-202*n* is affiliated with the AP MLD 101 and includes multiple antennas 204*a*-204*n*, multiple radio frequency (RF) transceivers 209*a*-209*n*, transmit (TX) processing circuitry 214, and receive (RX) processing circuitry 219. Each APs 202*a*-202*n* may independently communicate with the controller/processor 224 and other components of the AP MLD 101. FIG. 2A shows that each AP 202*a*-202*n* has separate multiple antennas, but each AP 202*a*-202*n* can share multiple antennas 204*a*-204*n* without needing separate multiple antennas. Each AP 202*a*-202*n* may represent a physical (PHY) layer and a lower media access control (MAC) layer.

FIG. 2B shows an example of STA 111 in accordance with an embodiment. The embodiment of the STA 111 shown in FIG. 2B is for illustrative purposes, and the STAs 111-114 of FIG. 1 could have the same or similar configuration. However, STAs come in a wide variety of configurations, and FIG. 2B does not limit the scope of this disclosure to any particular implementation of a STA.

As shown in FIG. 2B, the STA 111 may include antenna(s) 205, a RF transceiver 210, TX processing circuitry 215, a microphone 220, and RX processing circuitry 225. The STA 111 also may include a speaker 230, a controller/processor 240, an input/output (I/O) interface (IF) 245, a touchscreen 250, a display 255, and a memory 260. The memory 260 may include an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an IF or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the controller/processor 240 controls the reception of downlink signals and the transmission of uplink signals by the RF transceiver 210, the RX processing circuitry 225, and the TX processing circuitry 215 in accordance with well-known principles. The controller/processor 240 can also include processing circuitry configured to provide management of channel sounding procedures in WLANs. In some embodiments, the controller/processor 240 may include at least one microprocessor or microcontroller.

The controller/processor 240 is also capable of executing other processes and programs resident in the memory 260, such as operations for management of channel sounding procedures in WLANs. The controller/processor 240 can move data into or out of the memory 260 as required by an executing process. In some embodiments, the controller/processor 240 is configured to execute a plurality of applications 262, such as applications for channel sounding, including feedback computation based on a received null data packet announcement (NDPA) and null data packet (NDP) and transmitting the beamforming feedback report in response to a trigger frame (TF). The controller/processor 240 can operate the plurality of applications 262 based on the OS program 261 or in response to a signal received from an AP. The controller/processor 240 is also coupled to the I/O interface 245, which provides STA 111 with the ability to connect to other devices such as laptop computers and handheld computers. The I/O interface 245 is the communication path between these accessories and the main controller/processor 240.

The controller/processor 240 is also coupled to the input 250 (such as touchscreen) and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B shows one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As shown in FIG. 2B, in some embodiment, the STA 111 may be a non-AP MLD that includes multiple STAs 203*a*-203*n*. Each STA 203*a*-203*n* is affiliated with the non-AP MLD 111 and includes an antenna(s) 205, a RF transceiver 210, TX processing circuitry 215, and RX processing circuitry 225. Each STAs 203*a*-203*n* may independently communicate with the controller/processor 240 and other components of the non-AP MLD 111. FIG. 2B shows that each STA 203*a*-203*n* has a separate antenna, but each STA 203*a*-203*n* can share the antenna 205 without needing separate antennas. Each STA 203*a*-203*n* may represent a physical (PHY) layer and a lower media access control (MAC) layer.

As explained, indoor positioning has grown in popularity over the last decade in parallel with the growth in the number of personal wireless devices as well as wireless infrastructure. While there are numerous use cases, such as smart phones, smart buildings, surveillance, disaster management, industry and healthcare, all of them require wide availability and good accuracy. Those positioning technologies can generally be categorized into four main groups: i) a ranging-based method, ii) a dead-reckoning-based method, iii) a fingerprinting-based method, and iv) a hybrid method.

The first category is the range-based method. Positioning is estimated through range measurements, such as measurement of distances from anchor points or reference points with known position coordinates. Examples of wireless range measurements include Wi-Fi received signal strength indicator (RSSI), Wi-Fi round-trip time (RTT), and UWB time difference of arrival (TDoA). Examples of non-wireless ranging technology include optical (laser) ranging methods.

The second category is the pedestrian dead reckoning (PDR) or sensor-based method. In this category, the positioning is estimated through accumulating incremental displacements on top of a known initial position. The displacement may be computed by continuously sampling sensors, such as an inertial measurement unit (IMU) including magnetometer, accelerometer, and gyroscope.

The third category is the fingerprinting-based method. The position of an object is looked-up in a database using position-dependent inputs. There are two phases: offline and online. In the offline phase, a database is constructed, or a model is trained from an extensive set of input-output pairs. The output is the position, and the input is a set of physical quantities corresponding to a particular location, such as magnetic signatures and wireless signal strength. In the online phase, the physical quantities of interest are measured and then used to look up the position in the database.

The fourth category is a combination of aforementioned methods which is commonly known as sensor fusion or range-and-sensor-based methods. Positioning is first estimated from sensor readings through PDR and then updated through fusion with range measurements.

Dead Reckoning is a method of estimating the position of a moving object by adding incremental displacements to its last known position. Pedestrian dead reckoning (PDR) specifically refers to scenarios where the moving object is a pedestrian walking indoors or outdoors. With the proliferation of sensors embedded in smart devices, such as smartphones, tablets, and smartwatches, the PDR has naturally evolved to complement wireless positioning technologies, which have long relied on devices providing Wi-Fi or cellular services, as well as more recent and less common technologies like UWB. An inertial measurements unit (IMU) may refer to a device that comprises various sensors with distinct functions, including the accelerometer for measuring linear acceleration, the gyroscope for measuring angular velocity, and the magnetometer for measuring the strength and direction of the magnetic field. These sensors can detect motion and enable estimation of velocity (i.e., speed and heading), thereby enhancing positioning accuracy. Methods utilizing the PDR can generally be categorized into two groups: an inertial navigation (IN) method and a step-and-heading (SH) method.

The IN method tracks the position and orientation (i.e., direction), also known as attitude or bearing, of the device in two- or three-dimensional (3D) space. To determine the instantaneous position, the IN method integrates the 3D acceleration to obtain velocity, and then integrates velocity to determine the displacement from the starting point. Similarly, in order to obtain the instantaneous orientation, the IN method integrates the angular velocity from the gyroscope to obtain changes in angles from the initial orientation. However, measurement noise and biases at the level of the accelerometer and gyroscope cause a linear growth of orientation offset over time due to rotational velocity integration, and quadratic growth of displacement error over time due to double integration of the acceleration. This often forces the IN system into a tradeoff between positioning accuracy and computational complexity. Tracking and mitigating biases in sensor reading as well as managing the statistics of measurement noise over time often require complex filters with high-dimensional state vectors.

Unlike the IN method, which continuously tracks the position of the device, the SH method updates the device position less frequently by accumulating steps taken by the user from the starting point. Every step can be represented as a vector, with a magnitude indicating the step size and an argument indicating the heading of the step. Instead of directly integrating sensor readings to compute displacement and changes in orientation, the SH method performs a series of operations toward that end. First, the SH system detects a step or a stride using various methods, such as peak detection, zero-crossing detection, or template matching. Second, upon detecting a step or stride, the SH system estimates the size of the step based on the sequence of acceleration over the duration of the step. Third, the SH system estimates the step heading using the gyroscope, magnetometer, or a combination of both. All three operations are prone to errors. The step detection may suffer from misdetection, for example, due to low peaks or false alarm caused by double peaks, among other drawbacks. Similarly, errors in underlying sensor measurements and idealized models can lead to inaccuracies in step size and heading estimation. Like the IN method, the SH method also involves a trade-off between computation complexity and positioning accuracy. However, unlike the IN method, the SH method is less susceptible to drifting, particularly when estimated trajectories are corrected with range measurements in what has been previously defined as sensor-fusion-based indoor positioning system.

A sensing device provides readings of motion-related physical quantities and signals of key motion-related events. The sensing device includes an inertial measurement unit (IMU) which contains various sensors and step detectors among other components.

The IMU may be a hardware module built in the mobile device accompanying the user that measures the device's pose and orientation as well as acceleration using sensors such as gyroscope, accelerator, and magnetometer. The gyroscope measures the three-dimensional angular velocity, the accelerometer measures three-dimensional acceleration, and the magnetometer measures the strength of the magnetic field in three dimensions. These sensors measure and report key fundamental quantities from which other kinetic quantities can be derived.

In some embodiments, in the context of inertial navigation methods for positioning, the acceleration can be integrated to obtain velocity and double-integrated to obtain displacement. The rotational velocity can be integrated to obtain a rotation angle.

In some embodiments, in the context of step and heading methods of positioning, the acceleration provides a step detector, which is also known as a pedometer, means to detect a step and measure the step size. The angular velocity and magnetic field provide means to determine the direction or heading of motion of moving object. More sophisticated step detectors can be capable of computing various motion related quantities, such as quantities related to gait which represents the user's walking patterns, as well as detecting motion-related events such as falling, stopping, and walking in a straight line.

In some embodiments, walking in a straight line may include two events: i) walking continuously and ii) maintaining the heading or the direction. Walking continuously may require a threshold number of steps per minute or non-zero speed, which can be inferred from the acceleration. Maintaining heading may require a constrained device pose, which can be inferred from the gyroscope or magnetometer. In some embodiments, the sensing device and its components can be implemented using software, hardware, or a combination of both.

Figure 3:
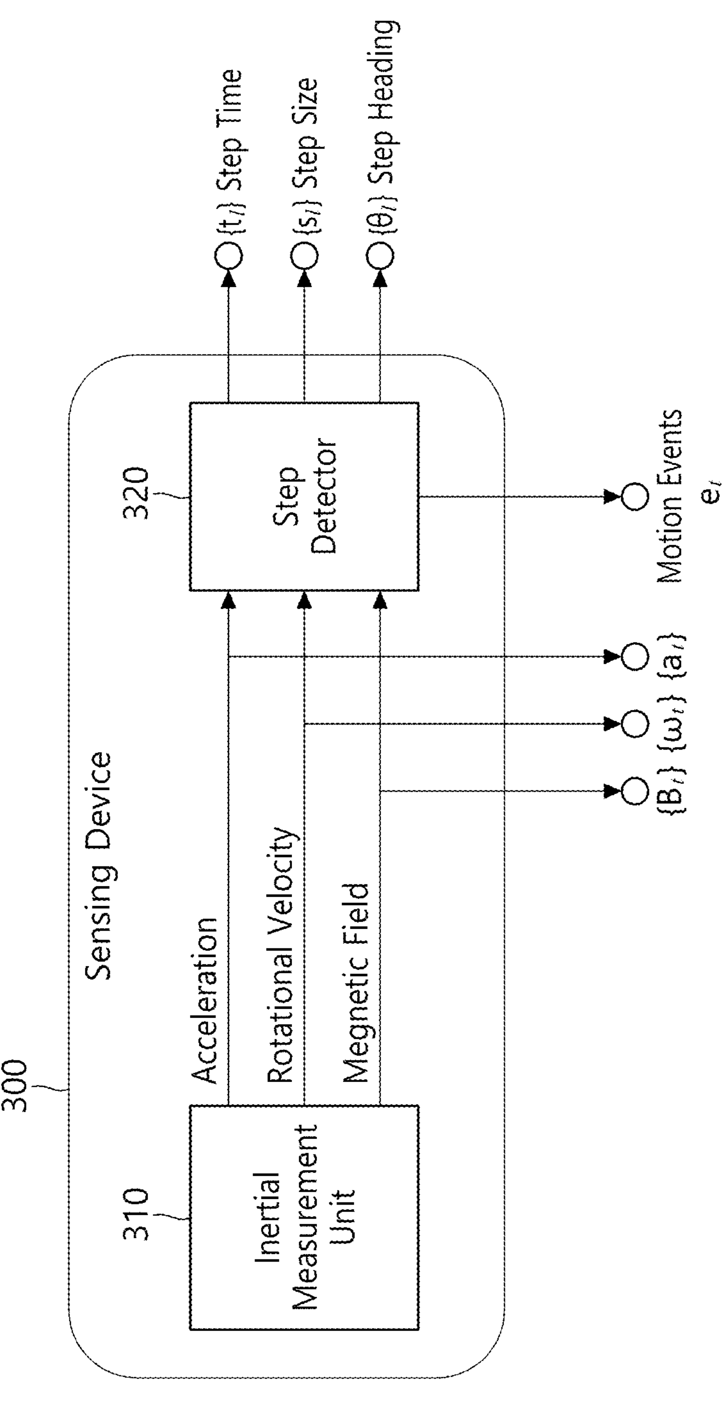
FIG. 3 illustrates an example of a sensing device in accordance with an embodiment.

FIG. 3 shows an example of a sensing device in accordance with an embodiment. The sensing device 300 depicted in FIG. 3 is for illustration purposes and does not limit the scope of this disclosure to any particular implementations.

In FIG. 3, the sensing device 300 includes an inertial measurement unit (IMU) 310 and a step detector 320. The IMU 310 streams sensor readings, such as acceleration ($\alpha_t$), rotational velocity ($\omega_t$), and magnetic field strength ($B_t$) to the step detector 320. In some embodiments, the IMU 310 may feed the sensor readings to other device or unit, for example, a correction unit depicted in FIG. 11. The step detector 320 detects step time ($t_l$) and computes step size ($S_l$) and step heading ($\theta_l$) using the input $\{\alpha_t, \omega_t, B_t\}$ and provide the detected parameters to one or more other device or units, such as a correction unit depicted in FIG. 11. In some embodiments, the step detector 320 may detect a motion event of moving object and provide it to other device or unit, for example, a correction unit depicted in FIG. 11.

In a wireless (or range-based) positioning method, target devices establish their positions by measuring distances to a set of reference points with known locations, also referred to as anchor points. Measuring distance to another device (e.g., an anchor point) involves wireless signaling between the two devices, known as ranging. The ranging process is facilitated by various wireless technologies, either explicitly through a standard ranging mechanism or implicitly through capabilities such as receive power or channel impulse response measurements. Below are examples of commonly used ranging mechanisms (for simplicity, it is assumed that clocks are synchronized across all devices, and imperfections such as clock drift are absent).

Figure 4:
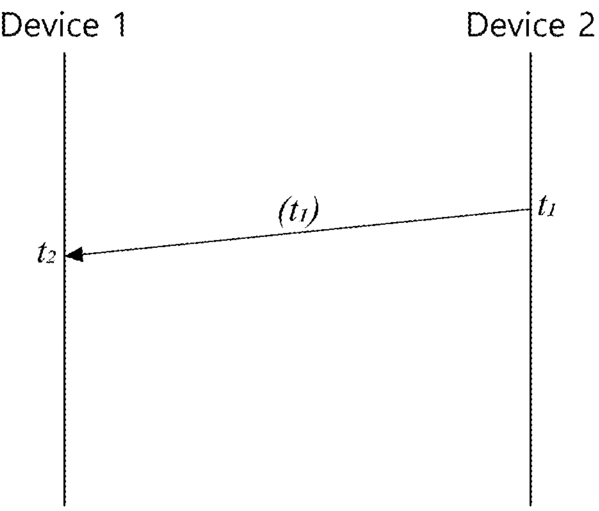
FIG. 4 illustrates a timing diagram depicting necessary signaling to compute time of flight (ToF) in accordance with an embodiment.

Hereinafter, time of flight (ToF) in accordance with the example of FIG. 4 is described. FIG. 4 illustrates a timing diagram depicting necessary signaling to compute time of flight (ToF) in accordance with an embodiment. As illustrated, one device (illustrated as device 2), typically an AP, may send a message to a target device, illustrated as device 1, embedding the timestamp $t_1$ at which the message was sent. The target device, device 1, may pick up the message, decode it, timestamps its reception at $t_2$, and computes the time of flight and corresponding device-AP distance as:

$$r = c\cdot(t_1 - t_2),$$

where c refers to the speed of light.

In some embodiments, to estimate its two-dimensional position, the target device measures its distance from at least 3 APs. The target device may compute its position as the intersection of 3 or more circles centered around 3 APs, the radius of each is the corresponding device-AP distance. This method is standard in range-based positioning and is known as trilateration, or multi-lateration when there are more than 3 APs. Other, more sophisticated methods of position estimation from range measurements include Bayesian filtering, e.g. Kalman filter. The ranging mechanism to compute time of flight computation is standardized by UWB in IEEE 802.15.4z as one-way ranging (OWR).

Figure 5:
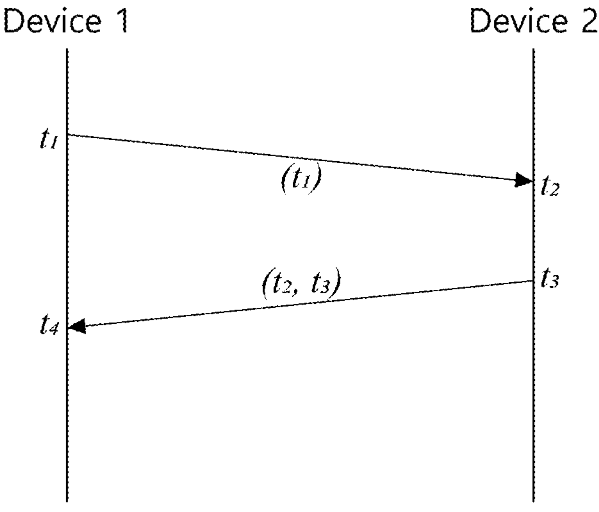
FIG. 5 illustrates a timing diagram depicting necessary signaling to compute round-trip time in accordance with an embodiment.

Hereinafter, round-trip time (RTT) in accordance with the example of FIG. 5 is described. FIG. 5 illustrates a timing diagram depicting necessary signaling to compute round-trip time in accordance with an embodiment. One device, typically the target device illustrated as device 1, send an empty message to the AP, illustrated as device 2, and timestamps the transmission time $t_1$. The AP, device 2, picks up the message, timestamps the reception time $t_2$, responds with a message, timestamps that as $t_3$, and embeds the two timestamps. The target device, device 1, then picks up the response, timestamps the reception time $t_4$, and extracts the two timestamps, and computes the round-trip time from the 2 pairs of timestamps, one at the device side, and another at the AP side, as well as the device-AP distance as:

$$r = c\cdot(t_4 - t_1 - t_3 + t_2)/2$$

where c refers to the speed of light.

The target device can estimate its (two-dimensional) position from 3 or more ranges using the methods explained above, with the only difference being the fact that RTT would be used to compute the device-AP distance instead of ToF. This mechanism is standard in UWB, known as two-way ranging (TWR), and in WiFi, known as fine timing measurement (FTM).

Figure 6:
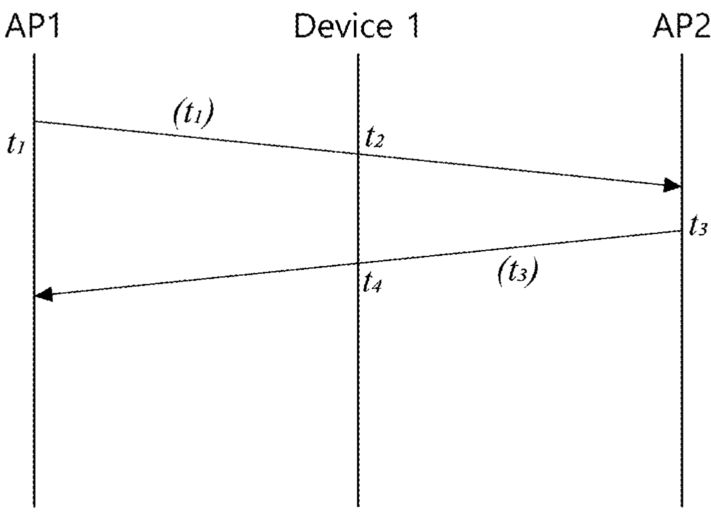
FIG. 6 illustrates downlink time difference of arrival (Downlink TDoA) in accordance with an embodiment.

Hereinafter, downlink time difference of arrival (Downlink TDoA) in accordance with the example illustrated in FIG. 6 is described. As illustrated, there are two APs, AP1 and AP2, and a device. The device in question does not determine its position by actively ranging with an anchor point, but rather by listening to the ranging between different pairs of anchor points to estimate the difference in the device-AP distances. One way of computing the distance difference is as follows. The 2 APs, AP1 and AP2, range with one another using the two-way ranging method described above. The target device timestamps the time $t_2$ at which it overhears the message sent by the AP, AP1, initiating the exchange and extracts the timestamp $t_1$ at which the message was sent. The target devices also timestamps the time $t_4$ at which it overhears the message sent by the AP, AP2, responding to the initiating AP and extracts the timestamp $t_3$ at which the response was sent. The target device then estimates the difference in the distances from the two APs as:

$$\Delta r = c \cdot (t_4 - t_2) - c \cdot (t_3 - t_1),$$

where c is the speed of light and Δr is the difference in the distances from the two APs.

In some embodiments, to estimate its two-dimensional position, the target device measures the distance difference for at least 3 pairs of anchors, for a minimum total of 4 anchors. The target device computes its position as the intersection of 3 or more hyperbolas. This method can be readily used in UWB where a ranging device can be configured to listen to ranging participants without actively participating in ranging. As of recent, this method has been standardized by WiFi in IEEE 802.11az "Next Generation Positioning" as passive ranging.

Figure 9:
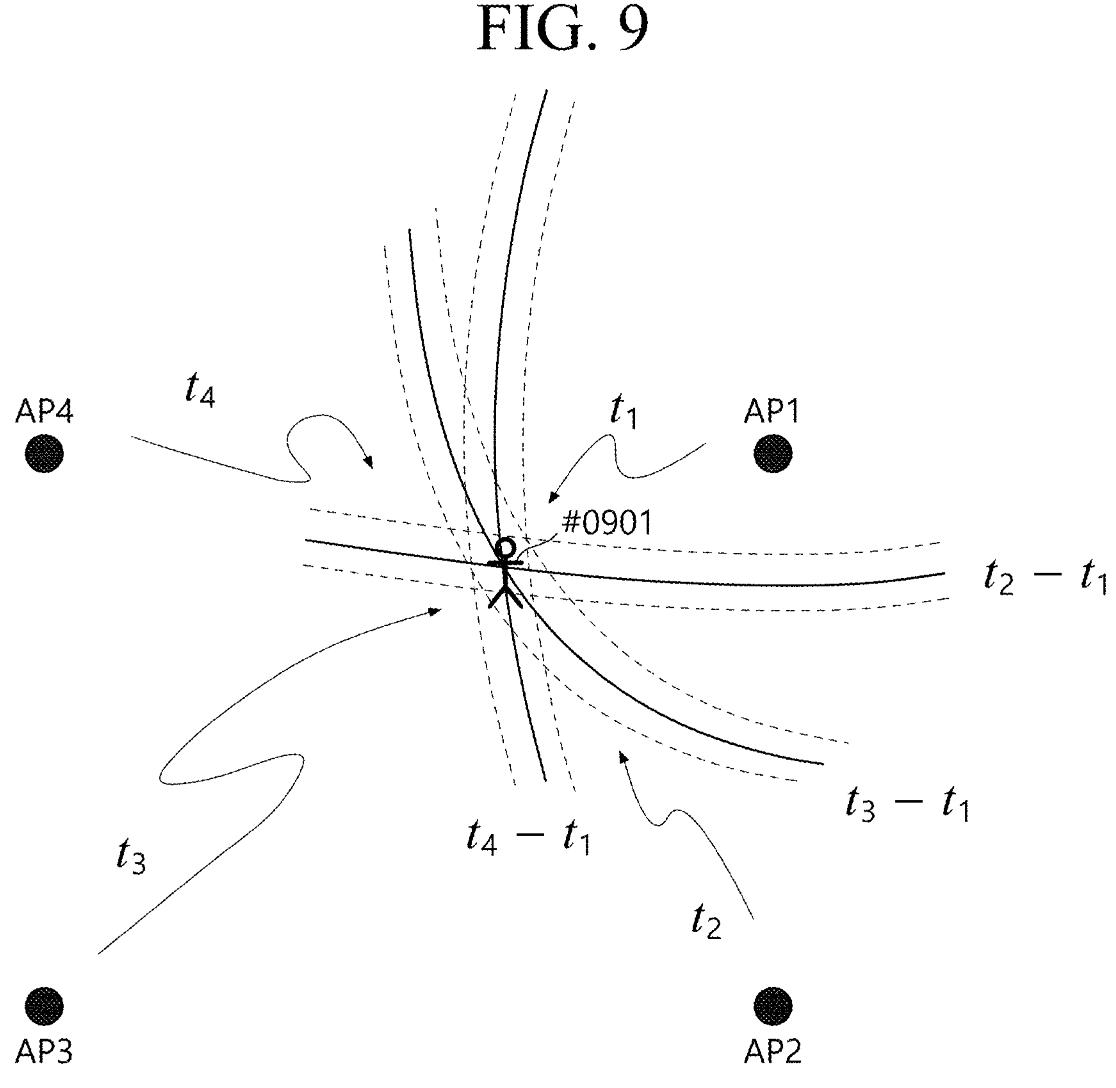
FIG. 9 provides a visual illustration of a downlink TDoA system in accordance with an embodiment.

FIG. 9 provides a visual illustration of a downlink TDoA system where a device needing to determine its position passively listens to the message exchange between pairs of APs at known positions and estimates the difference in distance with the APs of the pair. As illustrated, there are four APs, AP1, AP2, AP3 and AP4, and a target device 901.

Figure 7:
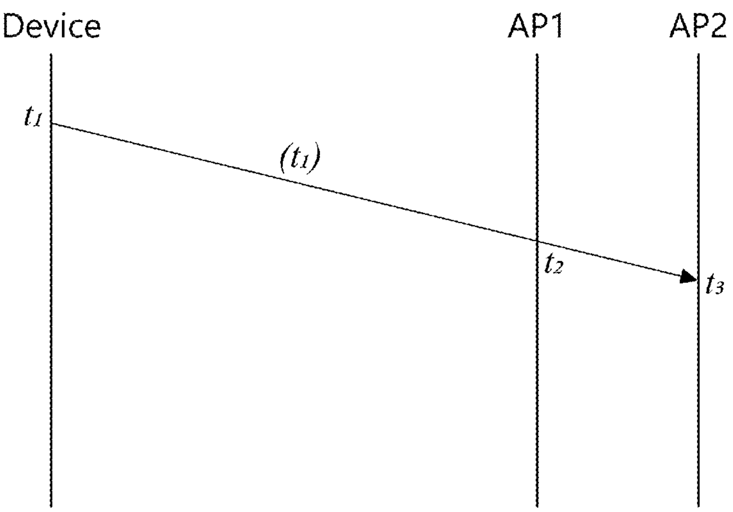
FIG. 7 illustrates a timing diagram depicting the necessary signaling to compute the time-difference of arrival in accordance with an embodiment.

Hereinafter, uplink time difference of arrival (uplink TDoA) in accordance with the example illustrated in FIG. 7 is described. FIG. 7 illustrates a timing diagram depicting the necessary signaling to compute the time-difference of arrival by a set of collaborating APs needing to estimate the position of a device of interest in accordance with an embodiment. In particular, FIG. 7 illustrates a device and two APs, AP1 and AP2. The device in questions sends a message embedding the expected time of transmission ($t_1$). The message is received by a set of collaborating anchor points, AP1 and AP2, at different times $t_2$ and $t_3$. Similar to downlink TDoA, a set of time differences is computed from which a set of corresponding distance differences and ultimately a position are estimated. Through this mechanism, the location of a mobile device can be estimated by the cellular network. Applied to indoor positioning, however, a technology through which inter-device distances can be estimated may allow for uplink TDoA to be used for position estimation.

Hereinafter, received signal strength indicator (RSSI) in accordance with this disclosure is described. In some embodiments, the receive power at a device of interest is equal to the transmit power at an anchor point less propagation losses that are a function of the device-anchor distance. Using a standard propagation model, e.g. the ITU indoor propagation model for WiFi, or a propagation model fitted on empirical data, the RSSI can be converted in a distance. One common model is the one-slope linear model expressing the relationship between RSSI and distance as follows:

$$RSSI = \beta + \alpha \cdot \log d$$

where α and β are fitting parameters. Following the inversion of RSSIs into distances, standard positioning methods that turn a set of distance measurements to a single position can be applied, e.g. trilateration.

Hereinafter, channel state information (CSI) in accordance with this disclosure is described. The device in question may estimate the channel frequency response, or alternatively the channel impulse response, which expresses how the environment affects different frequency components in terms of both their magnitude as well as their phase. Monitoring the changes in phase over time and over a range of frequencies can be used to compute the device-AP distance, and a wide range of methods exist for that purpose, e.g. multi-carrier phase difference used with Bluetooth low energy, among others.

Figure 8:
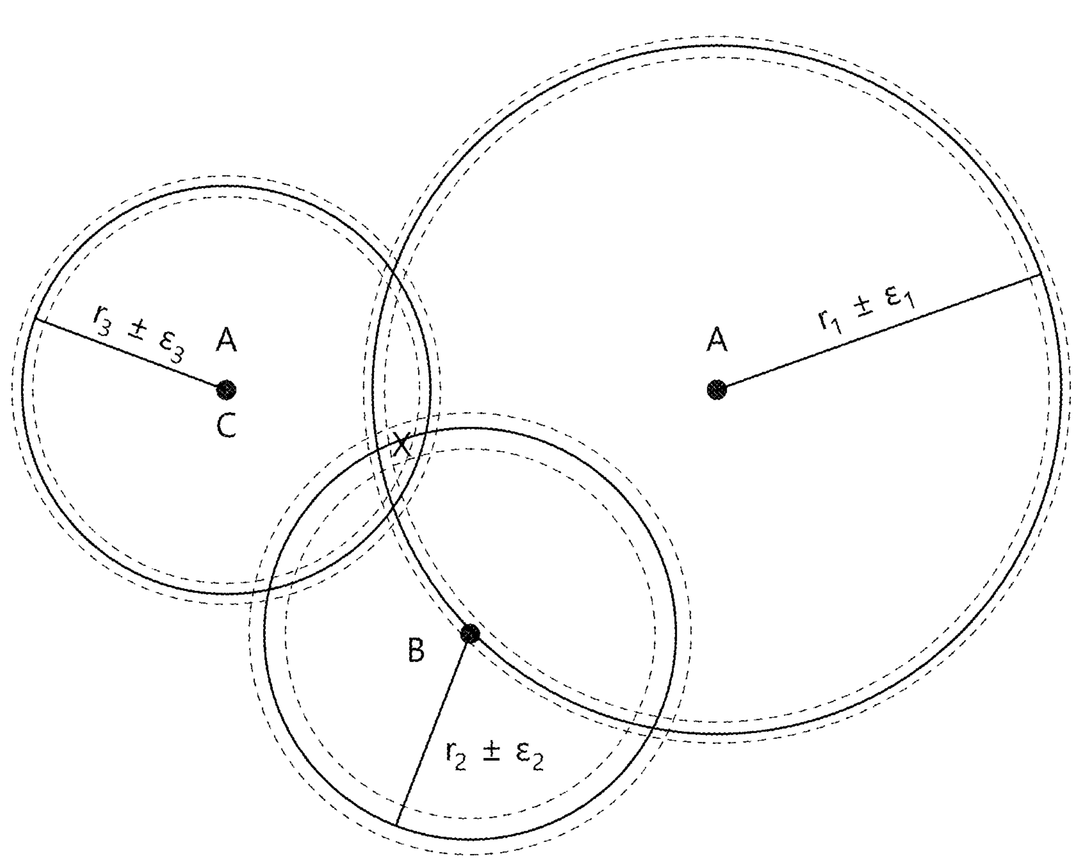
FIG. 8 illustrates an example trilateration method in accordance with an embodiment.

FIG. 8 shows an example trilateration method in accordance with an embodiment. The trilateration method depicted in FIG. 8 is for illustration purposes and does not limit the scope of this disclosure to any particular implementations.

Referring to FIG. 8, the trilateration estimates the position of a device ("X") from a set of range measurements. There are three anchor points (A, B, and C). Distances from A to X, B to X, and C to X are measured as $r_1 \pm \varepsilon_1$, $r_2 \pm \varepsilon_2$, and $r_3 \pm \varepsilon_3$, respectively. Therefore, the position of device X can be estimated by locating the intersection of three circles, each centered at one of anchor points A, B, C with the respective measured distance as its radius. Range measurements can be inferred from a variety of measured physical quantities, e.g. the time of flight (ToF), round-trip time (RTT), or receive power (RSSI).

Hereinafter, Kalman filters in accordance with this disclosure are described. In some embodiments, a Kalman filter recursively estimates the state of a dynamical system from a sequence of measurements obtained over time and an assumption of state trajectory. In some embodiments, the state can be the two- or three-dimensional location of a device or user. In certain embodiments, the state can be the distance of the device or user from a landmark or from a reference or anchor point. The Kalman may assume an underlying system that is modeled by two linear equations, a state transition/motion equation, and a measurement/observation equation.

A motion equation may describe the evolution of the state of the system and relates the current state to a previous state as follows:

$$x_k = A_k x_{k-1} + B_k u_k + v_k,$$

where $x_k$ is the current state, $x_{k-1}$ is the last state, $A_k$ is the state transition matrix, $u_k$ is the current input, $B_k$ is the control/input matrix, and $v_k \sim N(0, Q_k)$ is the process noise which represents uncertainty in state.

A measurement equation may relate the current observation to the current state as follows:

$$y_k = H_k x_k + w_k,$$

where $y_k$ is the latest observation, $H_k$ is the observation matrix, and $w_k \sim N(0, Q_k)$ is the observation noise.

At each time index k, the Kalman filter estimates the state of the system by applying a prediction step followed by an update step. The outcome of these two steps is the state estimate $\hat{x}_k$ at time index k and its covariance matrix $P_k$ which are in turn used to estimate the states at later points in time.

A prediction step may be used where the Kalman filter predicts the current state $\hat{x}_{k|k-1}$ (a priori estimate) from the most recent state estimate $\hat{x}_{k-1}$, its covariance $P_{k-1}$, and any inputs using the motion equation as follows:

$$\hat{x}_{k|k-1} = A_k\hat{x}_{k-1} + B_k u_k,$$

$$P_{k|k-1} = A_k P_k A_k^* + Q_k,$$

An update step may be used where the Kalman filter uses the latest observation to update its prediction and obtain the (a posteriori) state estimate $\hat{x}_k$ and its covariance $P_k$ as follows:

$$\hat{x}_k = \hat{x}_{k|k-1} + K_k(y_k - H_k\hat{x}_{k|k-1}),$$

$$P_k = (I - K_k H_k)P_{k|k-1},$$

where $K_k$ is the Kalman gain and is a function of the a priori estimate covariance $P_{k|k-1}$, observation matrix $H_k$, and observation noise covariance matrix $R_k$.

An extension of the Kalman filter beyond linear state-input and state-measurement relationships and Gaussian noise is known as the Bayesian filter. In the more general Bayesian framework, the motion equation and measurement equation may be replaced by the state transition kernel and the measurement likelihood function.

In the context of wireless (range-based) or sensor-fusion-based positioning, the state $x_k$ is typically the location of the device or user holding it, in which case the observation $y_k$ would be a range measurement, i.e. the measurement of the distance between the device and an anchor point. In some embodiments, the range measurements are pre-filtered, or pre-processed, before feeding them as observations to a positioning algorithm. In some embodiments the filter used to process the range measurements can itself be a Kalman filter, in which case the state of said filter $x_k$ may be the true distance between the device and anchor rather than the absolute position of the device. In some embodiments, regardless of the definition of the state of the system, its observations may be range measurements.

Ranging errors, which may be modeled as measurement noise, are assumed to be zero-mean additive Gaussian. In reality, however, these errors tend to be biased away from zero. Additionally, ranging errors tend to fluctuate, more so at longer distances. In some embodiments, positioning methods that use Bayesian filtering, e.g. Kalman filtering, it may be important to match the true statistics of the measurement noise, in both the mean and variance, in order to approach optimal estimation.

In some embodiments, ranging accuracy may be a measure of how close estimates of the true distances are to the true mean, and ranging precision may be a measure of how small the error variance is. Ranging accuracy and precision can both improve when the user holding the device faces the AP and can degrade significantly when their back is turned to the AP. As the user's body blocks the ranging signals to and from the APs, the signals reach the device through diffraction around the user and reflection off of surfaces in the environment, taking multiple, longer paths to reach the destination and making for a longer travel time.

Figure 10:
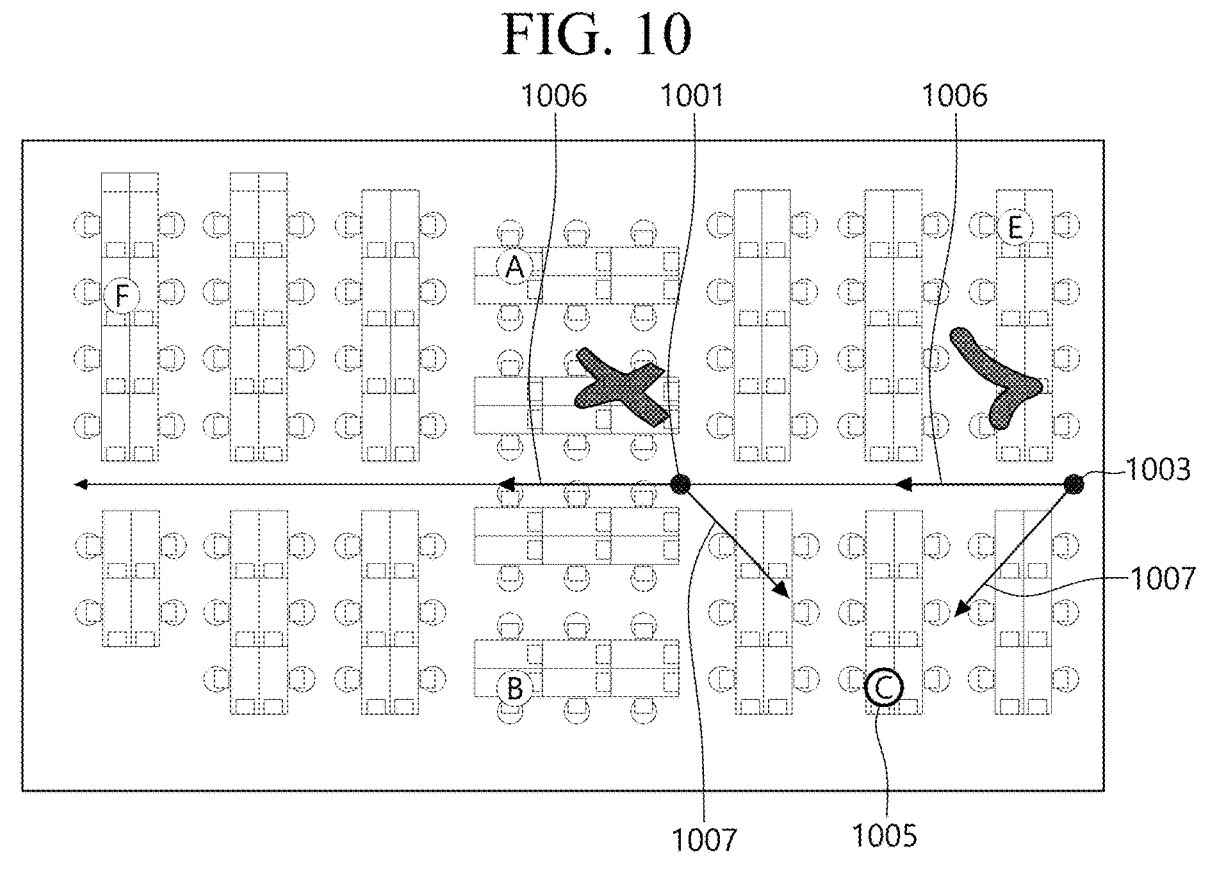

FIG. 10 illustrates an example of human blockage in accordance with an embodiment. In particular, as illustrated, wireless range measurements may be highly susceptible to the human body holding the device collecting them. As illustrated, measurement noise (i.e., ranging errors) are worse when the user's back is turned to the AP 1005, illustrated by position 1001, than when the user is facing the AP, illustrated by position 1003. In particular, FIG. 10 illustrates a heading vector 1006 and an AP direction 1007 at two different positions 1001 and 1003. The angle β between the heading vector 1006 and AP direction may provide an indication of the measurement accuracy. In particular, if the angle β is <90 degrees, there is a good chance the measurement is accurate, as illustrated by position 1003 where the angle is an acute angle. If the angle β is >90 degrees, there is an increased chance that the measurement is inaccurate, as illustrated by position 1001 where the angle is an obtuse angle, corresponding to when a user is facing away from the AP such that their body is between a direction of the device and the AP.

Accordingly, some embodiments may include a Human Blockage Compensator (HBC), as described in detail with reference to FIGS. 11 and 12 below, which may use the angle between the direction of the user's motion and the direction of the AP to estimate the mean and variance of the measurement noise and ultimately correct the range measurements with said AP.

Figure 11:
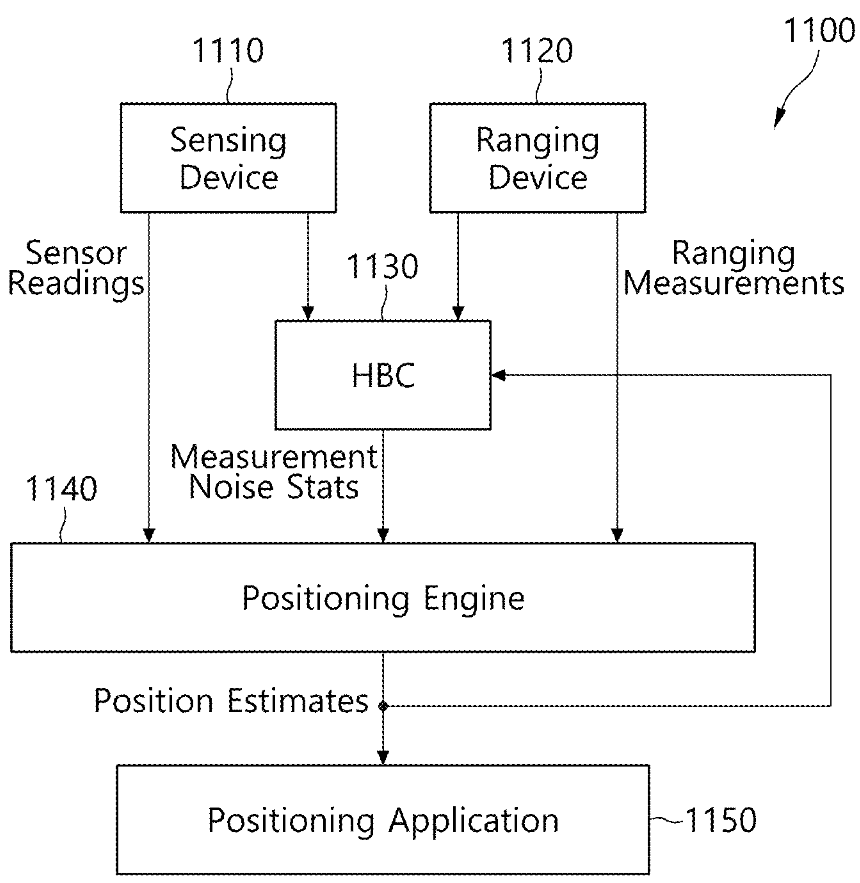
FIG. 11 illustrates an architecture of a positioning device in accordance with an embodiment.
Figure 12:
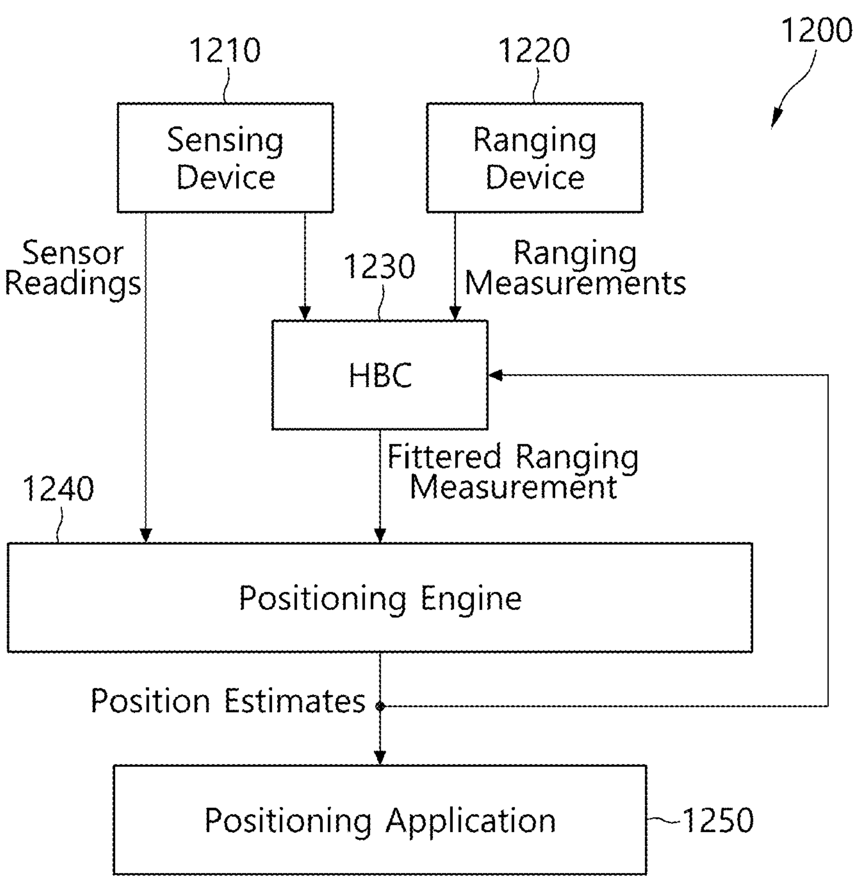
FIG. 12 illustrates another example of an architecture of a positioning device in accordance with an embodiment.

Positioning devices that include HBCs in accordance with several embodiments are illustrated in FIG. 11 and FIG. 12. In a first embodiment, as illustrated in FIG. 11, an HBC, as detailed below, may determine the statistics of the measurement noise vector, including its mean and covariance matrix, and passes on these statistics to a positioning engine. In a second embodiment, as illustrated in FIG. 12, the HBC may process (e.g., filter) the ranging measurements and pass on the processed (e.g., filtered) ranging measurements to a positioning engine.

In particular, FIG. 11 illustrates an architecture of a positioning device in accordance with an embodiment. The positioning device 1100 depicted in FIG. 11 is for illustration purposes and does not limit the scope of this disclosure to any particular implementations.

As illustrated in FIG. 11, the positioning device 1100 may generate range measurements, regardless of the technology used to obtain the measurements. In particular, the solutions may not depend on the radio (wireless) technology to obtain the ranges, e.g. distance measurements, with the anchor points. In some embodiments, the technology used to obtain measurements can be WiFi, Bluetooth, Ultra-Wide Band (UWB), among others. Additionally, systems in accordance with several embodiments may determine range measurements regardless of the type of the range measurement, i.e. the means of measuring the range. For example, the range can be the round-trip time (RTT), received signal strength (RSS), time of flight (ToF), time difference of arrival (TDoA), or other quantities that the distance can be inferred from.

In FIG. 11, the positioning device 1100 may comprise various components including a sensing device 1110, a ranging device 1120, a human blockage compensator (HBC) 1130, a positioning engine 1140, and a positioning application 1150.

The sensing device 1110 may include various sensors that measure the linear or rotational forces acting on the device 1100 as well as the device orientation. The sensing device 300 depicted in FIG. 3 may be an example of the sensing device 1110. The sensing device 1110 may include various hardware sensors that measure kinematic quantities. For instance, an accelerometer measures acceleration, a gyroscope measures rotational velocity, and a magnetometer measures magnetic field which can be used to compute orientation. Additionally, the sensing device 1110 may include various software sensors that generate contextual and activity-related information. For instance, a step detector or a pedometer detects individual steps and determines step size (length) and step heading, an event detector detects motion events of interest including a straight-line motion event. The straight-line motion event indicates that the user of the device 1100 walks continuously while maintaining a bounded heading (direction). The sensing device 1110 provides sensor data (e.g., sensor reading), such as motion event signal, step time, and step size and step heading to the HBC 1130.

The ranging device 1120 measures distances between the device 1100 and a set of anchor points. In some embodiments, the ranging device 1120 may be a STA supporting Wi-Fi or IEEE 802.11-2016 and newer standards, acting as a FTM initiator (FTMI). Under this capacity, the STA interacts with an access point supporting Wi-Fi or the IEEE 802.11-2016 and newer standards, acting as an FTM responder (FTMR) to compute the RTT between the two devices and convert it into distance. Alternatively, the ranging device 1120 can be any wireless device that measures the receive power from a reference wireless device and converts it into a distance using a propagation mode, such as ITU (International Telecommunication Union) indoor propagation model for Wi-Fi or another empirically trained model. In some embodiments, the range device 1120 may be an Ultra-Wide Band (UWB) ranging device (RDEV) acting as initiator that ranges with a UWB tag acting as a responder to compute RTT and converts that into a distance. In some embodiments, the ranging device 1120 may be a non-participant UWB RDEV that eavesdrops onto the ranging between UWB tags to compute the time difference of arrival (TDoA) of the signals transmitted by the different ranging participants, and converts that into a distance difference. In some embodiments, the ranging device 1120 may be a Bluetooth device that detects its proximity to a deployed Bluetooth beacon, i.e. a Bluetooth transmitter. As such, the ranging device 1120 can be prone to measurement noise in its distance measurements. The ranging device 1120 provides ranging measurements to the HBC 1130 and the positioning engine 1140.

In some embodiments, the positioning device may include a Human Blockage Compensator (HBC) 1130 that may indirectly correct the ranging measurements to compensate for measurement noise induced by the body of the user wielding the device running the positioning application.

In some embodiments, the HBC 1130 may be framed within the context of a positioning application. While application may commonly refer to a software program, or "app" for short, a distinction may be made between these two terms in this disclosure where app may refer specifically to the software manifestation or implementation of an application, which can alternatively have hardware, firmware, or mixed implementations. In some embodiments, the HBC 1130 may be one of several interacting components that serve a positioning application 1150.

In some embodiments, the HBC 1130 receives a sequence of sensor readings (e.g., acceleration, orientation derived from magnetic field, and rotational velocity), step information (e.g., step size and step heading), and motion events (e.g., a straight-line motion event) from the sensing device 1110. Additionally, the HBC 1130 also receives a sequence of ranging measurements from the ranging device 1120, as well as a sequence of position estimates from the positioning engine 1140. The HBC 1130 may determine the statistics of the measurement noise vector, including its mean and covariance matrix, and passes on these statistics to the positioning engine 1140. In certain embodiments, as illustrated in FIG. 12 described below, the HBC 1230 processes (e.g. filters) the ranging measurements and passes on the processed ranging measurements to the positioning engine 1240.

In some embodiments, the HBC 1130 performs the following key actions, described below.

In some embodiments, the HBC 1130 may infer the motion vector u from history of position estimates, ranging measurements, sensor readings, and/or other information.

In some embodiments, the HBC 1130 may determine the line joining the first position and last position in a time window, compute the slope of the line, extract its slope, and convert the slope into an angle. In certain embodiments, the HBC 1130 may determine the line that best fits a sequence of position estimates in a time window, compute the slope of the line, extract its slope, and convert the slope into an angle.

In some embodiments, the HBC 1130 may infer the AP vector $e_\alpha$ for all APs $\alpha=1, \ldots, A$; it can be defined as the vector extending from the user's most recent estimated position $\hat{x}$ and to the position of AP $\alpha$, which is assumed known.

In some embodiments, the HBC 1130 may compute the AP direction, which may be defined as the angle between the motion vector u and the AP vector $e_\alpha$, for all APs.

In some embodiments, the HBC 1130 may look up a trained mapping for the parameters related to the measurement model, e.g. measurement noise means $\{\mu_\alpha\}$, variances $$\{\sigma_\alpha^2\},$$

and/or covariance matrix R using the AP directions $\{\delta_\alpha\}$ and distance-type quantity, which could be the measured ranges $\{r_\alpha\}$ or the estimated distances $\{\hat{d}_\alpha\}$.

The positioning engine 1140 estimates device position using a combination of ranging measurements, or distances, and movement information. Then, the positioning engine 1140 provides position estimates to the positioning application 1150 and the HBC 1130.

The positioning application 1150 uses position estimates provided by the positioning engine 1140 to carry out various tasks that may or may not involve user interaction, such as navigation, proximity detection, and asset tracking.

FIG. 12 illustrates another example of an architecture of a positioning device in accordance with an embodiment. The positioning device 1200 may include a sensing device 1210, a ranging device 1220, an HBC 1230, a positioning engine 1240 and a positioning application 1250, which may be similar to those components already described with respect to the embodiment illustrated in FIG. 11. However, as illustrated in FIG. 12, the ranging device 1220 may provide range measurements directly to only the HBC 1230, unlike FIG. 11 in which the ranging device 1110 provides range measurements to the HBC 1130 and the positioning engine 1140. The HBC 1230 of FIG. 12 processes (e.g., filters) the ranging measurements and passes on the processed (e.g., filtered) ranging measurements to a positioning engine 1240.

Figure 13:
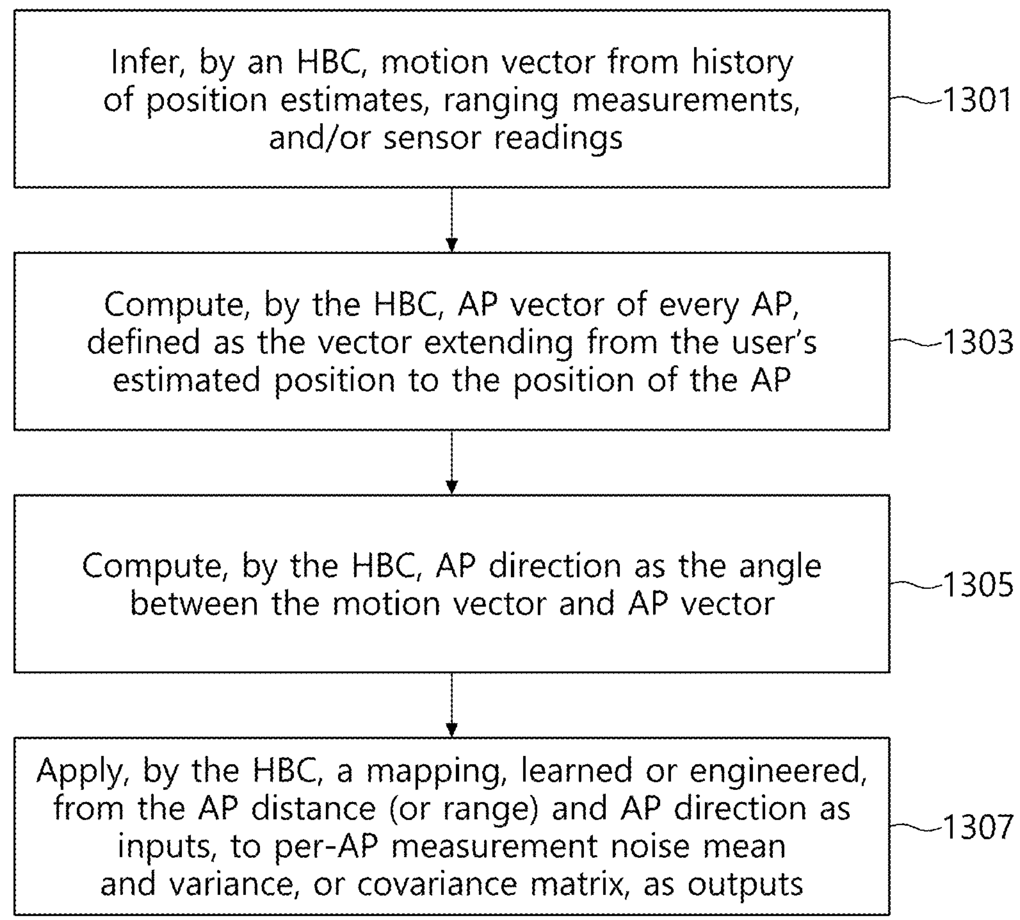
FIG. 13 illustrates a flow chart of an example process of estimating measurement noise parameters in accordance with an embodiment.

FIG. 13 illustrates a flow chart of an example process of estimating measurement noise parameters in accordance with an embodiment. Although one or more operations are described or shown in particular sequential order, in other embodiments the operations may be rearranged in a different order, which may include performance of multiple operations in at least partially overlapping time periods. The flowchart depicted in FIG. 13 illustrates operations performed in the HBC 1130 or 1230 to estimate measurement noise parameters. The flowchart in FIG. 13 is detailed with reference to FIGS. 11 and 12.

The process 1300, in operation 1301, the HBC infers motion vector from history of position estimates, ranging measurements, and/or sensor readings. In some embodiments, the HBC may determine the line joining a first position and a last position in a time window, compute a slope of the line, extract its slope, and convert the slope into an angle. In certain embodiments, the HBC may determine the line that best fits a sequence of position estimates in a time window, compute the slope of the line, extract its slope, and convert the slope into an angle.

In operation 1303, the HBC computes an AP vector for every AP, defined as the vector extending from the user's estimated position to the position of the AP.

In operation 1305, the HBC computes the AP direction as the angle between the motion vector and the AP vector for all the APs.

In operation 1307, the HBC applies a mapping, learned or engineered, from the AP distance (or range) and AP direction as inputs, to per-AP measurement noise mean and variance, or covariance matrix, as outputs.

In some embodiments, a filter, e.g. Kalman filter (KF), may be used to process the ranges, or range measurements to compensate for blockage effects.

In some embodiments, for every AP, the range filter is run on the ranges with said AP. The state that the KF tracks is the true distance between the device in the AP, d.

In some embodiments, a device may use the following state transition model for the KF:

$$d_k = d_{k-1} + v_k,$$

where $d_k$ is the current distance, $d_{k-1}$ is the previous distance, and $$v_k \sim N(0, \sigma_{P,k}^2)$$

is the process uncertainty which accounts for the change in distance from a particular AP as the user moves. The variance of the process uncertainty, $$\sigma_{P,k}^2,$$

can be chosen to be fixed-valued or time-varying, e.g.

$$\sigma_{P,k}^2 = \tilde{\sigma}_P^2 \Delta t_k^2,$$

where $\Delta t_k$ is the time between consecutive ranges.

In some embodiments, a device may use the following observation model for the KF:

$$r_k = d_k + w_k$$

where $r_k$ is the latest range, and $$w_k \sim N(\mu_k, \sigma_k^2)$$

is the measurement noise reflecting the ranging error.

In some embodiments, there may be an offline phase and an online phase. In some embodiments, in the offline phase, two mappings $\mu(\gamma, \delta)$ and $\sigma^2(\gamma, \delta)$ are determined. The mappings may be from a distance-type quantity $\gamma$, and the angle $\delta$ between the user's direction of motion and their direction with the AP. The mapping $\mu(\cdot,\cdot)$ and $\sigma^2(\cdot,\cdot)$ may be to the mean of the measurement noise and to its variance. The distance-type quantity $\gamma$ can be chosen to be the measured distance, i.e. the range $r_k$, or an estimate of the distance $\hat{d}_k$.

In some embodiments, while the mapping $$\sigma_a^2(y_a, \delta_a)$$

gives the measurement noise variance for the range with a AP $\alpha$ as a function of a distance-type quantity $\gamma_\alpha$ and the direction $\delta_\alpha$, an alternative mapping can be defined, namely the measurement noise covariance $\Sigma^{(\alpha,\alpha')}(\gamma_\alpha, \gamma_\alpha', \delta_\alpha, \delta_\alpha')$ for all pairs of APs $\alpha$ and $\alpha'$. In this case, the Kalman filter may not process the range measurements on an individual basis, but as one vector, so the observation model becomes:

$$r_k = d_k + w_k,$$

where $r_k=[r_{1,k} \ldots r_{A,k}]^T$ is the vector of range measurements, $d_k=[d_{1,k} \ldots d_{A,k}]^T$ is the vector of true distances, and $w_k=[w_{1,k} \ldots w_{A,K}]^T$ is the measurement noise vector, $w_k \sim N(\mu_k, R_k)$, and $\mu_k=[\mu_{1,k} \ldots \mu_{A,K}]^T$ is the vector of the means of the measurement noise at the individual AP level.

In some embodiments, there may be two or more frameworks for building the mappings $\{\mu_\alpha\}$, $$\{\sigma_a^2\},$$

and R. In a first framework in accordance with certain embodiments, the mappings may be learned from labeled data through statistical techniques or supervised learning techniques. In another framework in accordance with some embodiments, the mappings may be engineered or defined through, for e.g. analytical relationship, or lookup tables.

Learned Mappings

Described hereinafter are learned mappings in accordance with this disclosure. One way of building the two mappings $\mu(\cdot,\cdot)$ and $\sigma^2(\cdot,\cdot)$ in accordance with this disclosure is as described below.

In some embodiments, a premises may be sampled, i.e. distance measurements are collected at measurement points. The ground truth position, and thus the ground distance between the measurement point location and the different APs may be known by design.

In some embodiments, for every observation r, the true distance between the measurement point and an AP of interest is determined, and the ranging error e is computed as $$e = r - d.$$

In some embodiments, for every observation, the direction of the user's motion is determined from the ground-truth trajectory. Additionally, the user's direction with the AP is also determined. Finally, the angle δ between the user's direction of motion and their direction with the AP is computed.

In some embodiments, for every observation, the ranging error is placed into a bin indexed by the range measurement r and the angle δ. The range axis is partitioned into bins of size R, e.g. R=1 m, and the angle axis is partitioned into bins of size B, e.g. $B=5^0$.

In some embodiments, the errors of all the points are binned accordingly. For every bin (r, δ), the mean μ(r, δ) and variance $\sigma^2(r, \delta)$ of the ranging errors are determined.

Figure 14:
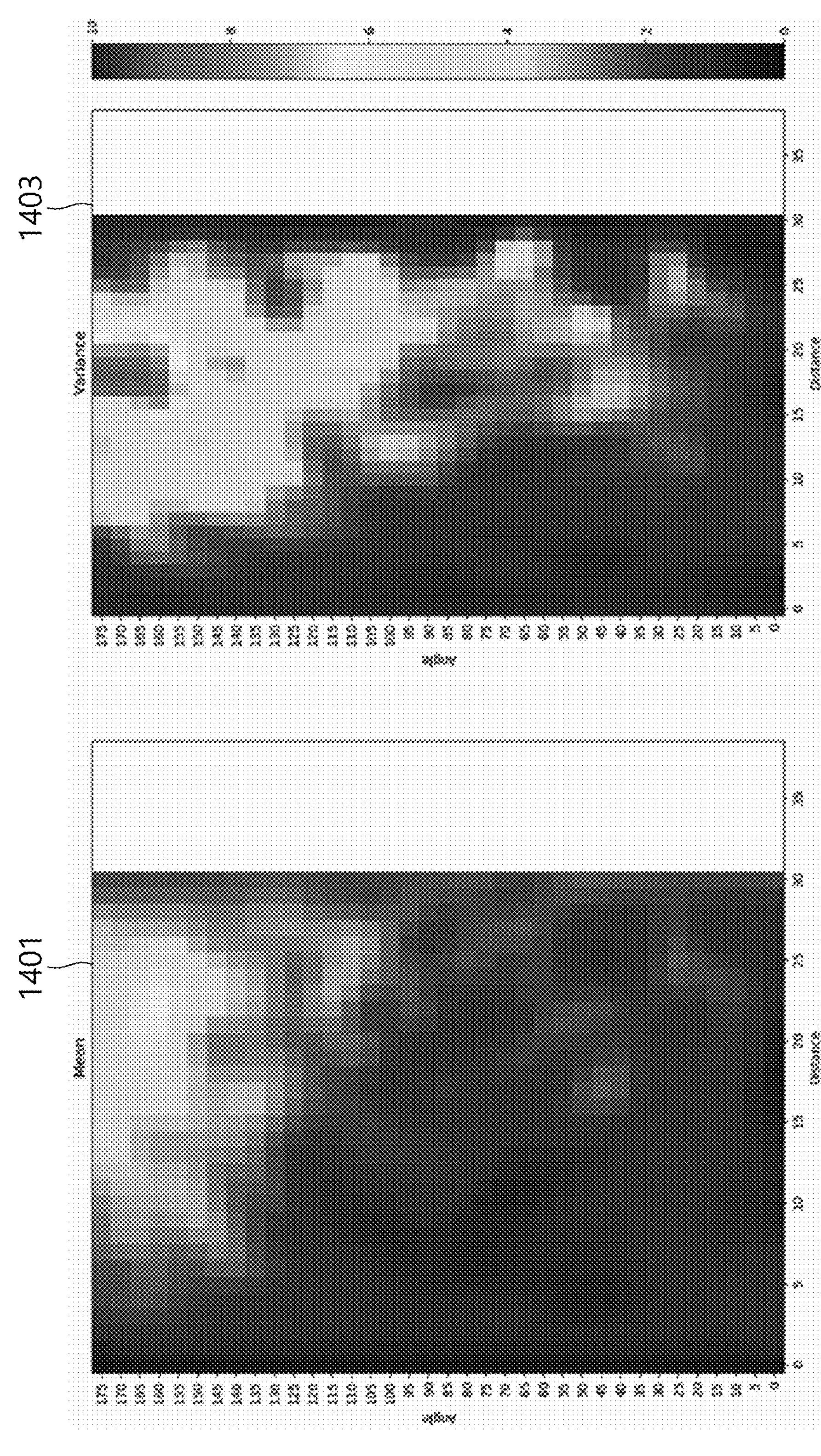
FIG. 14 illustrates two matrices representing the map from range measurement r and the angle δ with the AP into the mean and variance of the measurement noise in accordance with an embodiment.

FIG. 14 illustrates two matrices representing the map from range measurement r and the angle δ with the AP into the mean and variance of the measurement noise in accordance with an embodiment. In particular, graph 1401 illustrates a mean of the measurement noise based on distance and angle and graph 1403 illustrates a variance of the measurement noise based on distance and angle.

Engineered Mappings

Hereinafter, engineered mappings in accordance with this disclosure are described. In some embodiments, instead of learning the mapping, the mappings may be defined analytically. In some embodiments, the measurement noise mean μ(r, δ) and variance $\sigma^2(r, \delta)$ mappings can be defined as follows:

$$(r, \delta) = (ar^2 + br + c)\cdot(1 - \alpha \cdot e^{-g\delta}),$$

where α, b, and c are real valued polynomial coefficients, α is in the range [0,1], and g is positive. The two mappings for μ and $\sigma^2$ may have different coefficients.

In some embodiments, if the range measurements $\{r_\alpha\}$ with the different APs were to be processed jointly instead of separately, then the covariance matrix R of the measurement noise vector w can be defined through the noise covariance of the AP pairs $\Sigma^{(\alpha,\alpha')}(\gamma_\alpha, \gamma_{\alpha'}, \delta_\alpha, \delta_{\alpha'})$, for e.g.:

$$\sum\nolimits^{(a,a')}(y_a, y_{a'}, \delta_a, \delta_{a'}) = \cos(\delta_a - \delta_{a'})\cdot\sigma(y_a, \delta_a)\cdot\sigma(y_{a'}, \delta_{a'})$$

Online Phase

Hereinafter, online phase in accordance with this disclosure are described. In some embodiments, in the online, or operating phase, the range filter which processes streaming range measurements interacts with the positioning operation. The positioning operation may be an algorithm estimating the device position from ranges with the APs and other information. The distance filter may output to the positioning operation a filtered distance, and may receive from the positioning operation a history of position estimates $\{\hat{x}_k\}$.

In some embodiments, a device may produce an estimate $\hat{d}_k$ for its distance with a given AP upon receiving a new range $r_k$. Accordingly, at every epoch k, every distance filter (one for every AP) may run the following steps described below.

In some embodiments, the distance filter receives a new range $r_k$.

In some embodiments, the distance filter computes the a priori distance and its variance $p_{k|k-1}$, as set forth:

$$\hat{d}_{k|-1} = \hat{d}_{k-1},$$
$$p_{k|k-1} = p_k + \sigma_P^2 \Delta t_k^2,$$

In some embodiments, the distance filter infers the motion vector $u_k$ from history of position estimates. In some embodiments, this can be done, for example, by determining the line that best fits a sequence of position estimates $\{\hat{x}_k\}$ in a time window, computing the slope of the line, extracting its slope, and converting the slope into a vector.

In some embodiments, the distance filter may infer the AP vector $e_k$.

In some embodiments, the distance filter may compute the AP direction $\delta_k$.

In some embodiments, the distance filter may determine the measurement noise mean and variance by evaluating their corresponding functions $\mu(r_k, \delta_k)$ and $\sigma^2(r_k, \delta_k)$.

In some embodiments, the distance filter may compute the a posteriori, i.e. corrected, distance estimate and its variance, by computing:

$$\hat{d}_k = \hat{d}_{k|k-1} + k_k\left(r_k - \mu(r_k, \delta_k) - \hat{d}_{k|k-1}\right),$$
$$p_k = (1 - k_k)p_{k|k-1},$$

where $k_k$ is the Kalman gain and is computed as follows:

$$k_k = \frac{p_{k|k-1}}{p_{k|k-1} + \sigma^2(r_k, \delta_k)}.$$

In some embodiments, it may be assumed that the HBC processes the ranges obtained from the ranging device before passing them on to the positioning engine. In certain embodiments, the HBC only determines the statistics of the measurement noise from the ranges, and passes on the statistics to the positioning engine.

The embodiments outlined in this disclosure can be utilized in conjunction with positioning algorithms that use the step size and heading information as inputs. Various embodiments provided in this disclosure can be employed in diverse environments, including museums for navigating through sections of museum and reading about pieces of art in the user's vicinity, transportation terminals such as subway, train stations, and airports for navigating to gates and shops, stores for locating products, and homes for triggering smart home actions, such as turning on lights when the user enters a room.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method for estimating a position of a moving object, the method comprising:

receiving one or more ranging measurements for distances between an object and one or more anchor points from a ranging device;

receiving sensing data from one or more sensors;

determining a distance and a heading direction of the object relative to a position of the one or more anchor points based on the one or more ranging measurements and the sensing data;

applying a mapping using the distance and the heading direction of the object to correct the ranging measurements; and determining a position of the object based on the corrected ranging measurements.

2. The method of claim 1, further comprising:

inferring a motion vector from a history of position estimates, the ranging measurements, and the sensing data;

computing an anchor point vector defined as a vector extending from an estimated position of the object to the position of the one or more anchor points;

computing an AP direction as an angle between the motion vector and the anchor point vector.

3. The method of claim 1, wherein the mapping is a trained mapping that is learned from labeled data through statistical analysis or supervised machine learning.

4. The method of claim 1, wherein the mapping is defined analytically using a function.

5. The method of claim 1, wherein the mapping is defined to give a mean and variance of a measurement noise as a function of a distance-type quantity and a heading direction.

6. The method of claim 1, wherein the mapping is a measurement noise covariance for a pair of anchor points.

7. The method of claim 1, further comprising using a Kalman filter to process the ranging measurements to compensate for blockage effects.

8. The method of claim 1, wherein the sensing data are associated with at least one of acceleration, orientation, rotational velocity, step size or step heading.

9. The method of claim 1, further comprising determining the distance and the heading direction of the object relative to the position of the one or more anchor points based on a sequence of prior position estimates.

10. The method of claim 1, wherein the mapping is a learned mapping that is determined by sampling a premises to determine ground truth positions of the one or more anchor points and ranging errors for different distances and angles relative to the one or more anchor points.

11. A device for estimating a position of the device, comprising:

one or more sensors configured to provide sensing data; and a processor coupled to the one or more sensors, the processor configured to cause:

receiving one or more ranging measurements for distances between an object and one or more anchor points from a ranging device;

receiving sensing data from the one or more sensors;

determining a distance and a heading direction of the object relative to a position of the one or more anchor points based on the one or more ranging measurements and the sensing data;

applying a mapping using the distance and the heading direction of the object to correct the ranging measurements; and determining a position of the object based on the corrected ranging measurements.

12. The device of claim 11, wherein the processor is further configured to cause:

inferring a motion vector from a history of position estimates, the ranging measurements, and the sensing data;

computing an anchor point vector defined as a vector extending from an estimated position of the object to the position of the one or more anchor points;

computing an AP direction as an angle between the motion vector and the anchor point vector.

13. The device of claim 11, wherein the mapping is a trained mapping that is learned from labeled data through statistical analysis or supervised machine learning.

14. The device of claim 11, wherein the mapping is defined analytically using a function.

15. The device of claim 11, wherein the mapping is defined to give a mean and variance of a measurement noise as a function of a distance-type quantity and a heading direction.

16. The device of claim 11, wherein the mapping is a measurement noise covariance for a pair of anchor points.

17. The device of claim 11, wherein the processor is further configured to cause using a Kalman filter to process the ranging measurements to compensate for blockage effects.

18. The device of claim 11, wherein the sensing data are associated with at least one of acceleration, orientation, rotational velocity, step size or step heading.

19. The device of claim 11, wherein the processor is further configured to cause determining the distance and the heading direction of the object relative to the position of the one or more anchor points based on a sequence of prior position estimates.

20. The device of claim 11, wherein the mapping is a learned mapping that is determined by sampling a premises to determine ground truth positions of the one or more anchor points and ranging errors for different distances and angles relative to the one or more anchor points.

* * * * *